United States Patent
Deutsch et al.

(10) Patent No.: US 10,346,318 B2
(45) Date of Patent: Jul. 9, 2019

(54) MULTI-STAGE MEMORY INTEGRITY METHOD AND APPARATUS

(71) Applicant: Intel Corporation, Santa Clara, CA (US)

(72) Inventors: Sergej Deutsch, Hillsboro, OR (US); David M. Durham, Beaverton, OR (US); Karanvir S. Grewal, Hillsboro, OR (US); Michael E. Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 15/263,962

(22) Filed: Sep. 13, 2016

(65) Prior Publication Data

US 2018/0074975 A1    Mar. 15, 2018

(51) Int. Cl.
*H04L 9/12* (2006.01)
*G06F 12/14* (2006.01)
(Continued)

(52) U.S. Cl.
CPC .......... *G06F 12/1408* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS 5,696,823 A    12/1997   Blaze
6,076,097 A     6/2000   London et al.
(Continued)

FOREIGN PATENT DOCUMENTS

WO    WO-2013002789 A1 *  1/2013  ............. G06F 21/72

OTHER PUBLICATIONS

Reconfigurable Hardware Implementations of Tweakable Enciphering Schemes . . . Lopez et al. IEEE (Year: 2010).*
(Continued)

*Primary Examiner* — Venkat Perungavoor
(74) *Attorney, Agent, or Firm* — Schwabe, Williamson & Wyatt, P.C.

(57) ABSTRACT

Embodiments of apparatus, method, and storage medium associated with multi-stage memory integrity for securing/protecting memory content are described herein. In some embodiments, an apparatus may include multiple stages having respective encryption engines to encrypt data in response to a write or restore operation; wherein the encryption engines are to successively encrypt the data in a plurality of encryption stages using a plurality of tweaks based on a plurality of selectors of different types $\{s_1, s_2, \ldots\}$. In embodiments, the multiple stages may further comprise one or more decryption engines to partially, fully, or pseudo decrypt the plural encrypted data, in response to a read, move or copy operation; wherein the one or more decryption engines are to partially, fully, or pseudo decrypt the plural encrypted data in one or more decryption stages using one or more tweaks based on a subset of the selectors of different types $\{s_1, s_2, \ldots\}$.

24 Claims, 7 Drawing Sheets

(51) Int. Cl.
  *G06F 3/06* (2006.01)
  *G06F 13/28* (2006.01)
  *G06F 21/72* (2013.01)
  *G06F 21/79* (2013.01)
  *H04L 9/06* (2006.01)
  *H04L 9/14* (2006.01)

(52) U.S. Cl.
  CPC .......... *G06F 3/0623* (2013.01); *G06F 3/0673* (2013.01); *G06F 13/28* (2013.01); *G06F 21/72* (2013.01); *G06F 21/79* (2013.01); *H04L 9/0631* (2013.01); *H04L 9/0637* (2013.01); *G06F 2212/1052* (2013.01); *G06F 2221/2107* (2013.01); *H04L 2209/12* (2013.01)

(56) References Cited

U.S. PATENT DOCUMENTS

| | | | |
|---|---|---|---|
| 6,678,828 | B1 | 1/2004 | Pham et al. |
| 7,774,681 | B2 | 8/2010 | Earhart et al. |
| 8,036,377 | B1* | 10/2011 | Poo ................ H04L 9/0631 380/28 |
| 9,213,653 | B2 | 12/2015 | Durham et al. |
| 9,405,919 | B2 | 8/2016 | Brumley et al. |
| 9,910,790 | B2* | 3/2018 | Yap .................. G06F 12/1408 |
| 2003/0007635 | A1* | 1/2003 | Li ..................... H04L 9/001 380/28 |
| 2003/0056118 | A1* | 3/2003 | Troyansky ........ H04L 9/0822 726/5 |
| 2004/0128458 | A1 | 7/2004 | Buhr |
| 2006/0015753 | A1 | 1/2006 | Drehmel et al. |
| 2009/0150745 | A1 | 6/2009 | Langner et al. |
| 2010/0223524 | A1 | 9/2010 | Duggan et al. |
| 2012/0278635 | A1* | 11/2012 | Hars ................ G06F 12/14 713/193 |
| 2012/0297271 | A1 | 11/2012 | Sommer et al. |
| 2013/0308775 | A1* | 11/2013 | Minematsu .......... H04L 9/0625 380/28 |
| 2015/0113268 | A1* | 4/2015 | Wu .................... G09C 1/00 713/160 |
| 2015/0200772 | A1* | 7/2015 | Yamada ............... H04L 9/0637 380/28 |
| 2015/0261965 | A1* | 9/2015 | Brumley ............. G06F 21/602 713/193 |
| 2015/0341166 | A1* | 11/2015 | Minematsu .......... H04L 9/0631 380/28 |
| 2015/0371055 | A1* | 12/2015 | Park ................. G06F 21/6218 713/165 |
| 2016/0056954 | A1* | 2/2016 | Lee .................. H04L 9/0625 380/28 |

OTHER PUBLICATIONS

ABC—A New Fast Flexible Stream Cipher Specifcations, Version 3.Anashin et al. (Year: 2006).*
David M . Durham et al., "Method and apparatus for efficiently determining memory integrity and achieving error correction from encryption/decryption", U.S. Appl. No. 14/998,054, filed Dec. 24, 2015, 83 pages.
David M. Durham et al., "Convolutional Memoery Integrity," U.S. Appl. No. 15/089,140, filed Apr. 1, 2016, 78 pages.
International Search Report and Written Opinion dated Nov. 22, 2017 for International Application No. PCT/US2017/045960, 18 pages.

* cited by examiner

MULTI-STAGE MEMORY INTEGRITY METHOD AND APPARATUS

TECHNICAL FIELD

The present disclosure relates to the field of computing. More particularly, the present disclosure relates to multi-stage memory integrity method and apparatus for ensuring integrity of content/data stored in memory of a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Key domain selectors, also referred to as 'crypto-colors', are values used for annotating memory data structures for enhanced security and which participate in the memory encryption process as tweaks, effectively acting as if a different key was used to encrypt the content/data being stored into a memory. Key domain selectors associate encrypted memory content/data with specific uses, code paths, or instances of the applications which are executing, allowing different access control policies to be applied to different software domains. Using key domain selectors, systems can offer increased protection against a range of corruption events and attacks that include software bug-related corruption events (e.g., Use-After-Free, UAF), buffer overflow attacks, physical attacks on memory, and malware attacks including inappropriate memory accesses due to return oriented programming (ROP) injected malware, among others. Key domain selector sizes can range from few bits (1, 2) to large numbers of bits (e.g., 32, 64 or 128).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
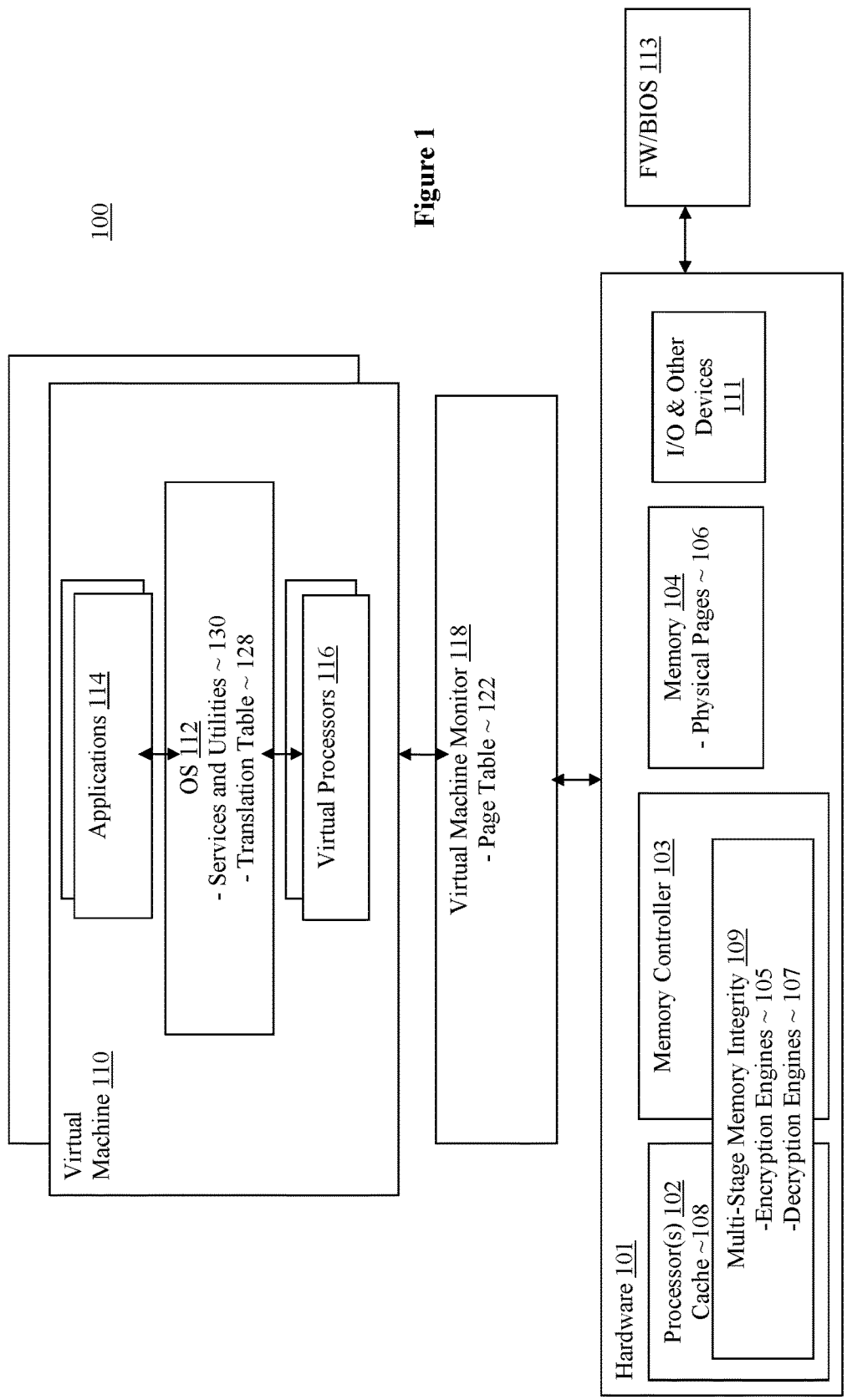
FIG. 1 illustrates an example computer device having the multi-stage memory integrity technology of the present disclosure, according to various embodiments.

In embodiments where key domain selectors are used, the key domain selectors may extend the physical address space and may be communicated to a memory integrity arrangement via unused address bits. Thus, memory integrity may be provided by using unused physical address bits (or other metadata passed through cache) to manipulate cryptographic memory integrity values, allowing software memory allocation routines to control the assignment of pointers (e.g., implement one or more access control policies). Unused address bits (e.g., because of insufficient external memory) passed e.g., through cache, may encode key domain information in the address so that different key domain addresses alias to the same physical memory location. Accordingly, by mixing virtual memory mappings and cache line granularity aliasing, any page in memory may contain a different set of aliases at the cache line level and be non-deterministic to an adversary. For further detail on key domain selectors that involve the usage of unused physical address bits, see co-pending U.S. patent application Ser. No. 15/089,140, entitled "Convolutional Memory Integrity," filed on Apr. 1, 2016, which Specification is hereby incorporated by reference.

In embodiments where key domain selectors are managed by the operating system and used as input (i.e., tweaks) to encryption and integrity algorithms, it may become challenging for devices to access the same data (e.g. via DMA), without devices also being aware of these key domain selectors. It may also be challenging to successfully decrypt content/data which is encrypted using some original address information as tweak, while the content/data has been moved to a different physical address, without keeping records of the history of the physical locations of the content. Specifically, when some memory content/data is encrypted using key domain selector information, this information, together with the physical address is directly included as input to the encryption process. The granularity of such content/data can be a page (e.g. 4 KB) or part of a page (e.g. a cache line). In order for the necessary level of security to be supported, the tweak needs to derive not only from the key domain selector but also from the physical address of the content/data. Such information is referred to as spatial selector. When content/data is paged in and out of memory, content/data is moved to a different physical address. Software, in this case needs to be able to retrieve the content/data using the new physical address where the content/data is stored while using the original key domain selector. This is not possible if the content/data is encrypted using a tweak that derives from both the original address and key domain selector. Furthermore, reversing any encryption transformation applied to the page before paging out has the drawback that any key domain selector information associated with the page content/data is lost, unless key domain selector information is maintained separately on a per data structure basis, which is costly.

These challenges may be illustrated with the following example. Consider a physical page $P_1$ having two data structures, $d_1$ and $d_2$, at two different locations with different physical addresses within the physical page $P_1$. The data structures are encrypted using tweaks that derive from different key domain selectors. That is, data structure $d_1$ is encrypted using a first key domain selector ($kds_1$), and data structure $d_2$ is encrypted using a second key domain selector ($kds_2$). In each case, the key domain selector and the physical address is bound to the encrypted content/data as a tweak and use in the encryption to protect the content/data. When the physical page $P_1$ is paged out, the content/data of the page can no longer be in encrypted form. This is because the tweak used by the encryption process is specific to the physical address of page $P_1$. When the content/data is placed back to memory, in a different physical page $P_2$, software should be able to retrieve the content/data using a new tweak based on the new physical address of $P_2$ and the original key domain selectors. This is not possible unless the content/data is completely decrypted when paged out into a hard disk. This also presents a challenge to the device driver, as it needs to be aware of key domain selector values when moving the content/data between the hard disk and memory.

Embodiments of the present disclosure provide apparatus, method, and storage medium associated with multi-stage memory integrity for securing/protecting memory content that may address the above described challenges. In embodiments, an apparatus for providing memory integrity may include a plurality of stages respectively having a corresponding plurality of encryption engines to encrypt content/data to be stored in a memory in response to a write or restore operation, prior to storing the content/data into the memory; wherein to encrypt the content/data, the encryption engines are to successively encrypt the content/data in a plurality of encryption stages using a plurality of tweaks based on a plurality of selectors of different types $\{s_1, s_2, \ldots\}$. In embodiments, the apparatus may further comprise one or more decryption engines correspondingly disposed at one or more of the plurality of stages to partially decrypt, fully decrypt or pseudo decrypt the plural encrypted data, in response to a read, move or copy operation; wherein the one or more decryption engines are to partially decrypt, fully decrypt or pseudo decrypt the plural encrypted data in one or more decryption stages using one or more tweaks based on a subset of one or more of the plurality of selectors of different types $\{s_1, s_2, \ldots\}$. These and other aspects will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Similarly, the terms "content," "data," "content/data," and the like, as used with respect to embodiments of the present disclosure, are also synonymous As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having machine instructions (generated from an assembler and/or a compiler), a combinational logic circuit, and/or other suitable components having logic that provide the described functionality. As used herein, the term "pseudo decrypt" refers to decryption operation that leads to an obfuscated or disguised version of the plaintext, as opposed to the plaintext itself.

Referring now to FIG. 1, wherein a computer device having the multi-stage memory integrity technology of the present disclosure, according to various embodiments, is shown. As illustrated, in embodiments, computing device 100 may include hardware 101, firmware (FW)/basic input/output services (BIOS) 113, VMM 118 and virtual machines (VM) 110, communicatively coupled with each other as shown. Hardware 101 may include one or more processors 102 having one or more levels of cache 108, memory controller 103, memory 104, which may be view by software as organized, e.g., into a number of physical memory pages 106, and I/O and other devices 111, which may include a hard disk. Memory controller 103 may be configured to manage and control access of memory 104. In embodiments, memory 104 may be accessed (written into or read from) on a cache line granularity (less than a memory page 106). In other embodiments, memory 104 may be accessed (written into or read from) on a granularity larger or smaller than a cache line.

In embodiments, computing device 100 may further include multi-stage memory integrity arrangement 109 incorporated with the multi-stage memory integrity technology of the present disclosure to secure/protect content/data stored in memory 104. In particular, multi-stage memory integrity arrangement 100 may be configured with a plurality of encryption engines 105 to encrypt each unit of content/data to be stored into memory 104, over a plurality of stages using a plurality of selectors of different types $\{s_1, s_2, \ldots\}$, and a plurality of decryption engines 107, where one or more of the plurality of decryption engines 107 may fully decrypt, partially decrypt or pseudo decrypt encrypted unit of content/data from memory 104, over one or more stages, using at least a subset of the plurality of selectors of different types $\{s_1, s_2, \ldots\}$. In embodiments, in each stage, a single type of selector $s_i$ and a single type of encryption/decryption algorithm, approach or technique are used for each unit of data. Thus, the technology may also be referred to as split-diffusion memory integrity technology, which enable the full, partial or pseudo decryption to continue to ensure integrity of the content/data for a wide variety of events, from moving memory pages out of memory 104 (page out), direct memory access (DMA), VM migration, and so forth. [Note: while not shown in the illustrated embodiments, one or more levels of cache 108 may be disposed outside of processor 102, between processor 102 and memory 104].

For the illustrated embodiments, multi-stage memory integrity arrangement 109 with encryption engines 105 and decryption engines 107 may be disposed across processor 102 (cache 108) and memory controller 104, e.g., with a last of the multiple stages disposed in memory controller 104, and one or more of the stages precede the last stage disposed in processor 102 (cache 108). In some embodiments, all stages of multi-stage memory integrity arrangement 109 with encryption engines 105 and decryption engines 107 may be disposed in memory controller 104.

Each VM 110 may include virtual processors 116 that are virtualization of processors 102, operating system (OS) 112 (which may be referred as guest OS), and application 114. VMM 118 may be configured to manage operation of VM 110, including, but is not limited to, virtual memory to physical memory mapping. OS 112 may include a number of services and utilities 130, and translation table 128. Translation table 128 may be configured to map virtual memory pages/addresses of a VM 110 to VM-physical memory pages/addresses of the VM 110. VMM 118 may include page table 122 configured to map VM-physical memory pages/addresses of the VM 110 to host physical memory pages/addresses 107 of memory 104. In embodiments, page table 122 may be implemented and referred to as second level address translation table (SLAT) or extended page table (EPT). Except from being benefited from the multi-stage or split-diffusion memory integrity technology of the present disclosure, VMM 118, VM 110, OS 112 and applications 114 may be any one of such elements known in the art. For examples, OS 112 may be Windows OS from Microsoft® Corporation, or UNIX/Linux available from various providers.

Similarly, FW/BIOS 113 may be any one of a number FW/BIOS known in the art. In embodiments, FW/BIOS 113 may include support for Unified Extensible Firmware Interface (UEFI).

Except for the multi-stage or split-diffusion memory integrity technology of the present disclosure, processor(s) 102 may be any one of a number of processors known in the art, having one or more processor cores and one or more levels of cache 108. Similarly, except for the multi-stage or split-diffusion memory integrity technology of the present disclosure, memory controller 103 may be any one of a number of memory controllers known in the art. Memory 104 may be any volatile or non-volatile memory known in the art, suitable for storing content/data. In addition to hard disk, examples of I/O and other devices 111 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

Before proceeding to further describe the multi-stage (split-diffusion) memory integrity technology, it should be noted that while for ease of understanding, the technology has thus far and will continue to be described in the context of an example computer system with VMs and VMM, the present disclosure is not limited. The multi-stage (split-diffusion) memory integrity technology may be practiced on a computer system with only a single operating OS, without any VM or VMM.

Figure 2:
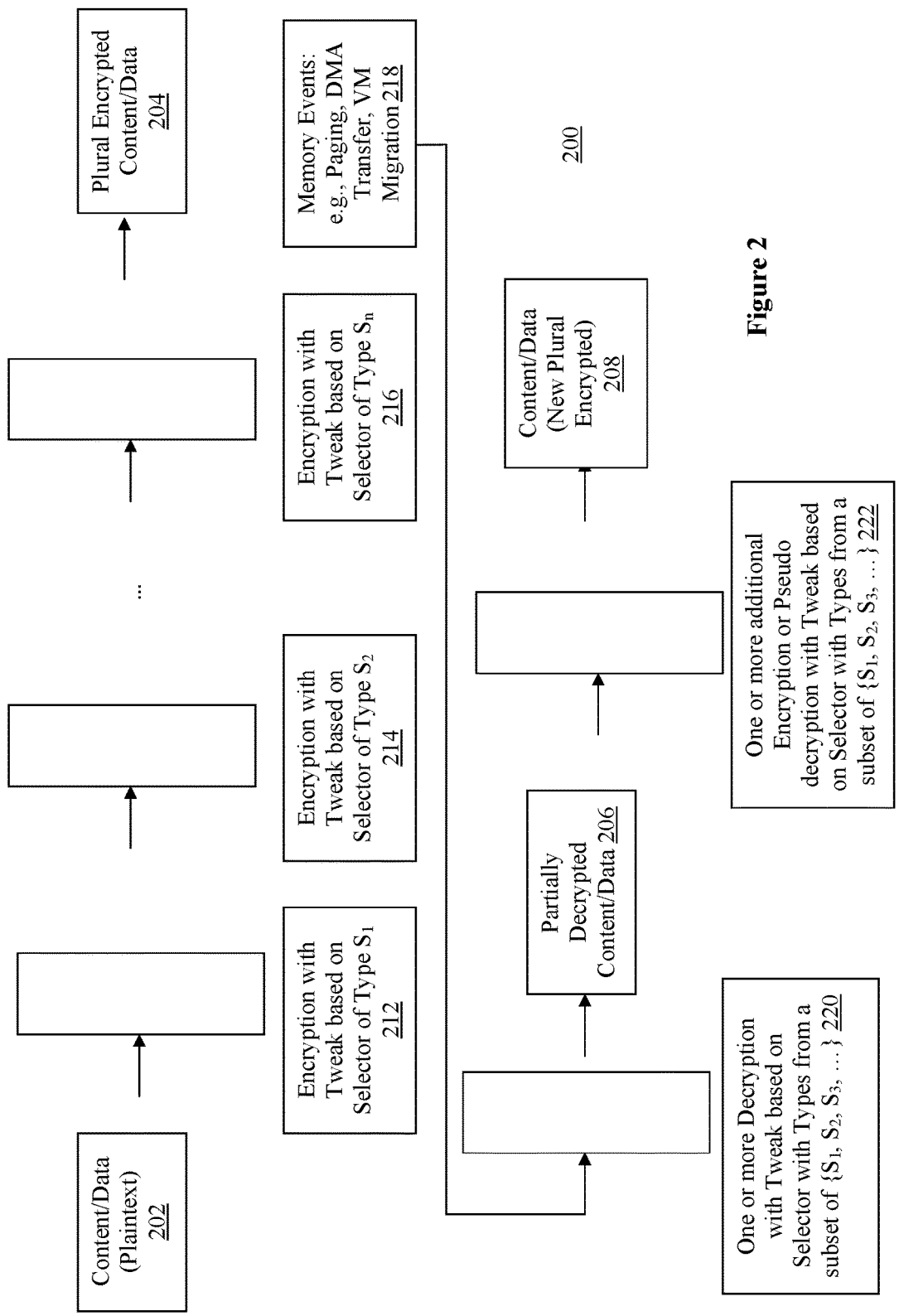
FIG. 2 illustrates an overview of the multi-stage memory integrity technology, according to various embodiments.

Referring now to FIG. 2, wherein an overview of the multi-stage (split-diffusion) memory integrity technology, according to various embodiments, is illustrated. As shown, process 200 for ensuring integrity of content/data stored in memory may include having each unit of one or more units of content/data (in plaintext) 202, to be written into memory 104 or page back into memory 104, successively encrypted, e.g., by a plurality of encryption engines, over a plurality of encryption stages 212, 214, . . . 216, using a plurality of tweaks based on a plurality of selectors of different types $\{s_1, s_2, \ldots s_n\}$, into plural encrypted content/data 204, prior to storing each unit into memory 104. In embodiments, in each stage, a single type of selector $s_i$ and/or a single type of encryption/decryption may be used for each unit of content/data. At each stage, the selector type based tweak may be used in any one of a number of manners to affect the cryptographic key or the way the encryption process is performed, e.g., but not limited to (i) as a tweak value used as in tweakable block cipher; (ii) as a value that impact the key generation process where the bits of the selectors are diffused into the bits of the cryptographic key; (iii) as the actual cryptographic key itself; and (iv) as a selector used for accessing the appropriate key from a lookup table. In embodiments, where a selector is used to identify a key, the corresponding keys of the selectors can be independently updated. Thus, for these embodiments, continuous replay protection may be provided by changing the key value for one selector, and then swapping and updating the memory contents from a previous selector/color value to the rekeyed one. Such continuous replay protection may be provided even with only two selectors/colors (black and white). For example, the key for one selector/color (e.g., black) may be independently changed and updated, while copying the memory contents form the other (white into black) to prevent an adversary from replaying the previous memory contents (e.g. that were previously black using the previous key). For encryption/decryption, at each stage, the encryption/decryption may be any one of a number of encryption/decryption algorithms, approaches or techniques, known in the art, including, but are not limited to, Advanced Encryption Standard (AES), ThreeFish, Triple Data Encryption Standard (3DES), Speck, Simon, Prince, and so forth. For AES encryption/decryptions, the ciphers may be, but are not limited to, electronic codebook (ECB) mode ciphers, Xor-encrypt-xor (XEX)-based tweaked-codebook mode with cipher text stealing (XTS) block ciphers, Liskow Rivest Wagner (LRW) ciphers or cipher block chaining (CBC) ciphers.

Additionally, in response to memory event 218, such as, paging multiple units of content/data out of memory 104, DMA of stored plural encrypted units of content/data 206 in memory 104, or moving plural encrypted units of content/data 206 in memory 104 in association with a VM migration, process 200 may include partially decrypting 220 each plural encrypted unit of content/data 204, e.g., by one or more decryption engines, over one or more decryption stages 220, using one or more tweaks based on a subset of one or more of the plurality of selectors of different types $\{s_1, s_2, \ldots \}$, to generate partially decrypted units of content/data 206. Similarly, in each stage, a single type of selector $s_i$ corresponding to the selector type used for encryption, may be used for each unit of content/data, and the tweak may be used in a manner similar to encryption during the same stage.

Thereafter, partially decrypted units of content/data 206 may be additionally encrypted or pseudo decrypted, over one or more encryption/decryption stages, using one or more tweaks based on a subset of one or more of the plurality of selectors of different types $\{s_1, s_2, \ldots \}$, to generate new plural encrypted units of content/data 208 for the new location, i.e., the hard disk holding the paged out memory pages, the device who made the DMA, or memory of the computing device now hosting the migrated VM. In embodiments, the pseudo decryption, if performed, may be performed e.g., by one of the decryption engines, whereas, the additional encryption, if performed, may be performed e.g., by the recipient device, such as, the hard disk receiving the memory page being paged out, the I/O device making the DMA, or the computer system receiving the VM being migrated.

Thus, the diffusion of the multi-stage (split-diffusion) memory integrity technology of the present disclosure may provide the cryptographic combination of the selector/color value with the content/data. The content/data becomes entwined with the corresponding color, so the meta data of the selector no longer needs to be remembered when storing the data. For inherent integrity, the diffusion results in a pseudo random result that destroys patterns in the plaintext data. Accordingly, when a diffused unit of content/data is read back from memory, and patterns reemerge in the unit of content/data after, it can be assumed that the integrity is preserved (i.e., the ciphertext was not modified and the right selector/color was used to access the data). On the other hand, if patterns do not emerge, an integrity check value (ICV) (e.g., one stored in memory) may be additionally used to ensure the integrity of the unit of content/data. If the ICV doesn't match the retrieved unit of content/data, an error may then be returned.

For example, a pattern may be a number of repeated bytes, words, etc. found in the unit of content/data that is improbable in a pseudorandom sequence of bits (which would be the result of decrypting a corrupted ciphertext). A pattern detector checking for 4 repeating words may be used (that is, 4 16-bit values are found to repeat in the 64 bytes of content/data). If 4 repeating words after de-diffusion is found, integrity may be assumed (i.e., the probability of this to occur in a pseudorandom sequence of 64 bytes of content/data is less than one in a billion, but fairly typically of real structured data), otherwise, a corresponding ICV stored in memory may be employed to double check to ensure integrity of the unit of content/data has not been compromised.

Figure 3:
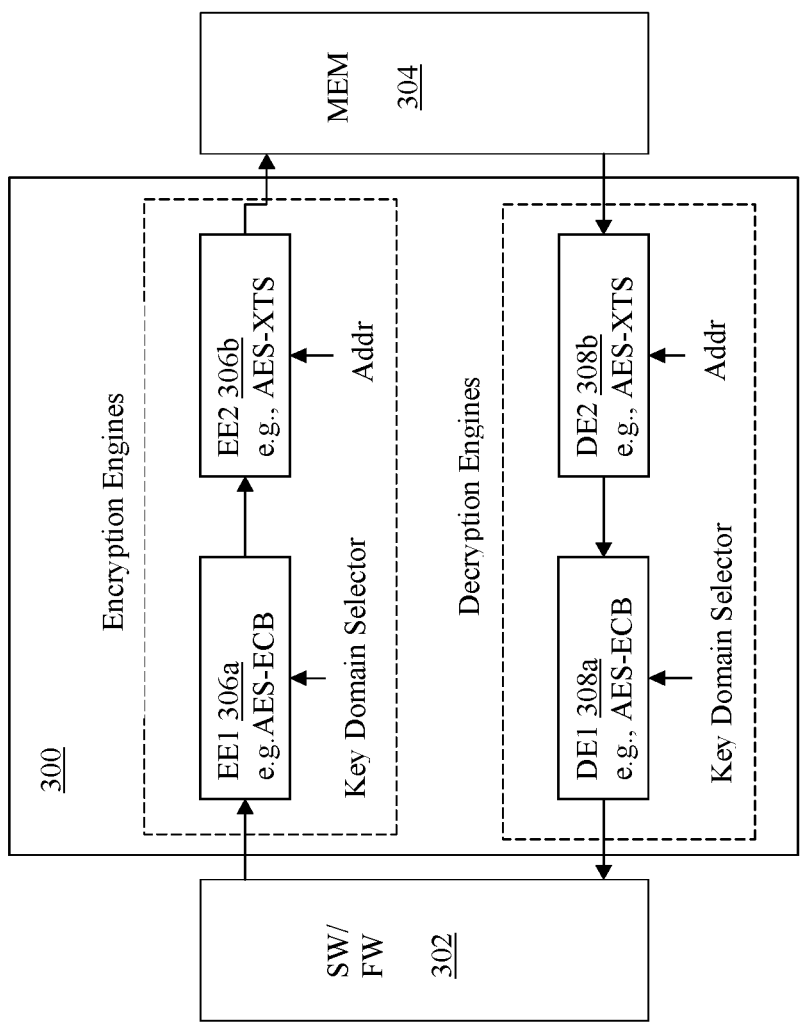
FIG. 3 illustrates an example embodiment of the multi-stage memory integrity technology of the present disclosure, according to various embodiments.

Referring now FIG. 3, wherein an example embodiment of the multi-stage (split diffusion) memory integrity technology of the present disclosure, according to various embodiments, is illustrated. As shown, multi-stage memory integrity arrangement 300, which may be multi-stage memory integrity arrangement 109, may include two encryption engines 306*a* and 306*b*, and two decryption engines 308*a* and 308*b*. A first of the encryption engines, encryption engine EE1 306*a*, may be configured to encrypt a unit of content/data, e.g., content/data from SW/FW 302 (which may be application 114, OS 112, FW/BIOS 113) to be written into memory 304 (which may be memory 104), during a first encryption stage, using a first tweak based on e.g., a key domain selector to generate a once encrypted content/data, and a second of the encryption engines, encryption engine EE2 306*b*, may be configured to encrypt the once encrypted unit of content/data, in a second encryption stage, using a second tweak based on e.g., a spatial selector to generate a twice encrypted unit of content/data, prior to write the unit of content/data into memory 304. The spatial selector may be based on the physical address (Addr) of the memory location within memory 304 where the twice encrypted unit of content/data would be stored.

A second of the decryption engines, decryption engine DE2 308*b*, counterpart of encryption engine EE2 306*b*, may be configured to first decrypt the twice encrypted unit of content/data being read out of memory 304, during a first decryption stage, using the second tweak based on e.g., the spatial selector to generate the once encrypted unit of content/data, and a first of the decryption engines, decryption engine DE1 308*a*, may be configured to second decrypt the once encrypted unit of content/data, in a second decryption stage, using the first tweak based on e.g., the key domain selector to generate the unit of content/data in plain text. In embodiments, encryption engines 306*a* and 306*b* may respectively comprise first and second block ciphers. Similarly, decryption engines 308*a* and 308*b* may also respectively comprise first and second block ciphers.

In embodiments, the first encryption block cipher EE1 306*a* and the first decryption block cipher DE1 308*a* may be AES ECB ciphers, and the second encryption block cipher EE2 306*b* and the second decryption block cipher DE2 308*b* may be AES XEX-XTS block ciphers. In alternate embodiments, both the first and second block ciphers EE1 and EE2 may be AES-XTS block ciphers, in particular, the first block cipher EE1 306*a* of the encryption engines and the first block cipher DE1 308*a* of the decryption engines may be AES-XTS block ciphers having less than 10 AES rounds combined with 512-bit diffusion, whereas, the second block cipher EE2 306*b* of the encryption engines and the second block cipher DE2 308*b* of the decryption engines may be an AES-XTS block cipher with 10 AES rounds.

Figure 4:
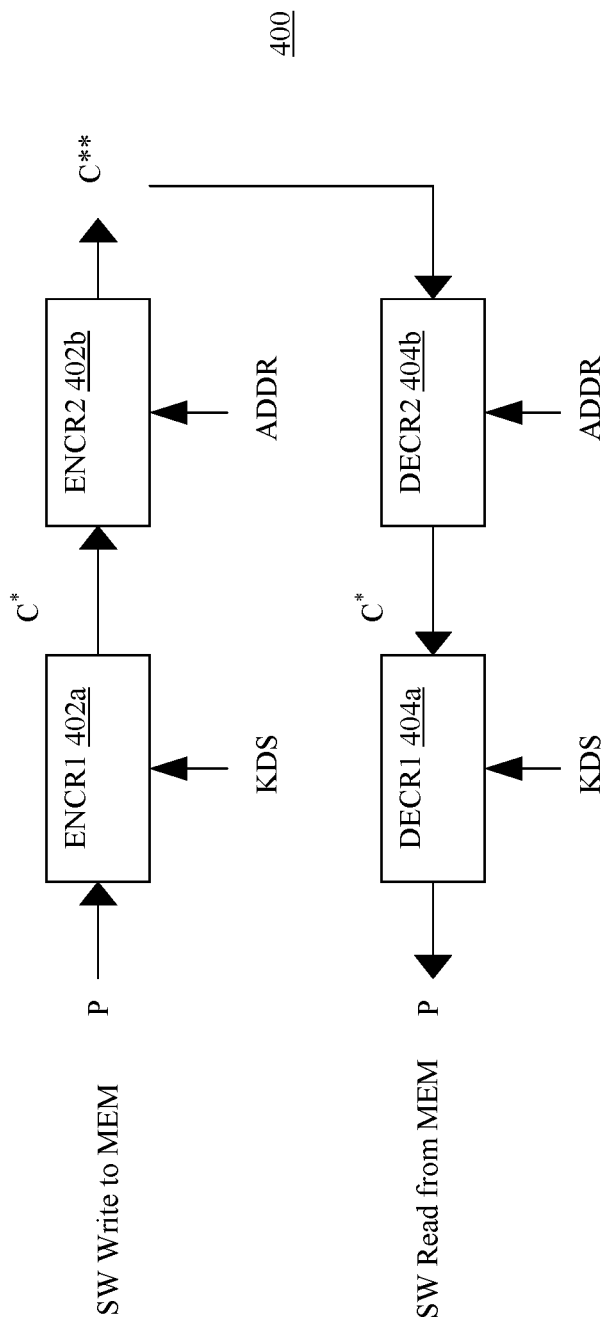
FIG. 4 illustrates an example process for writing to, and reading from memory, according to various embodiments.

Referring now to FIG. 4, wherein an example process for writing to, and reading from memory, according to various embodiments, is illustrated. As shown, process 400 for providing multi-stage (split diffusion) memory integrity, in response to memory write and read operations, may comprise operations performed at blocks 402*a*-402*b* and 404*a*-404*b*. The operations may be respectively performed by e.g., encryption engines 306*a*-306*b*, and decryption engines 308*a*-308*b*.

As described earlier, in response to a write to memory operation, e.g., by application 114, OS 112, or FW/BIOS 113, a unit of content/data in plaintext P may be first encrypted during a first encryption stage, using first encryption engine ENCR1 402*a* and a first tweak based on e.g., a key domain selector (KDS) to generate a once encrypted unit of content/data C*. Next, once encrypted unit of content/data C* may be second encrypted during a second encryption stage, using second encryption engine ENCR2 402*b* and a second tweak based on e.g., a spatial selector to generate a twice encrypted unit of content/data C. The spatial selector may be based on the physical address (Addr) of the memory location within the memory where the twice encrypted unit of content/data would be stored.

At a later point in time, in response to a read operation to read back the unit of content/data from the memory, the twice encrypted unit of content/data being read out of the memory may be first decrypted during a first decryption stage, using decryption engine DECR2 404*b* (counterpart of ENCR2 402*b*) and the second tweak based on e.g., the spatial selector to generate the once encrypted unit of content/data C*. Thereafter, the once encrypted unit of content/data C* may be second decrypted in a second decryption stage using decryption engine DECR1 404*a* (counterpart of ENCR1 402*a*) and the first tweak based on e.g., the key domain selector, to generate the unit of content/data in plain text P.

Figure 5:
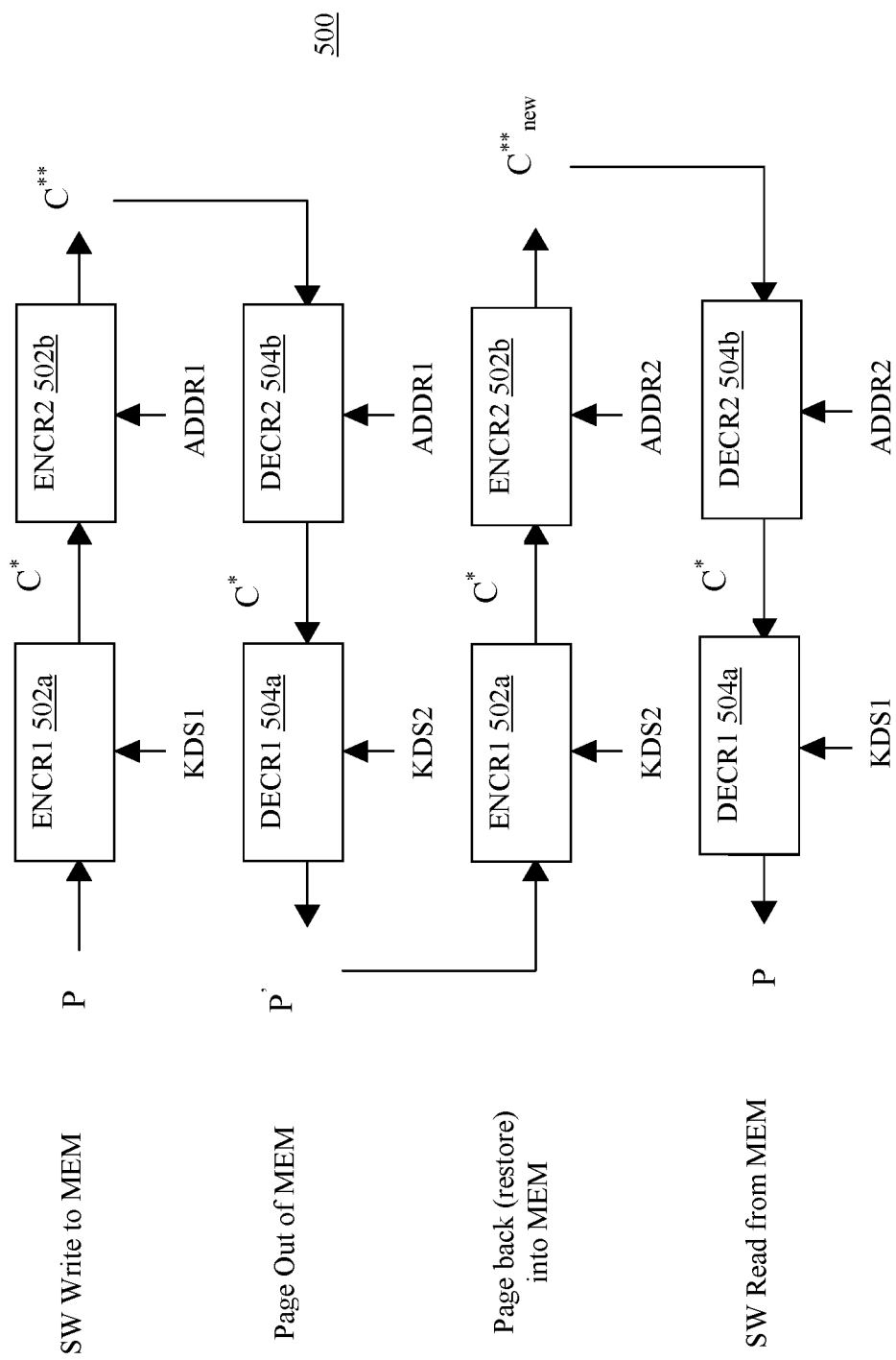
FIG. 5 illustrates an example process for paging out content from, and restoring paged-out content into memory, according to various embodiments.

Referring now FIG. 5, wherein an example process for paging out content from, and restoring paged-out content into memory, according to various embodiments. As shown, process 500 for providing multi-stage (split diffusion) memory security/protection, in response to memory page out and restore operations, may comprise operations performed at blocks 502*a*-502*b*, 504*a*-504*b*, 506*a*-506*b*, and 508*a*-508*b*. The operations may be respectively performed by e.g., encryption engines 306*a*-306*b*, and decryption engines 308*a*-308*b*.

As described earlier, in response to a write to memory operation, e.g., by application 114, OS 112, or FW/BIOS 113, a unit of content/data in plaintext P may be first encrypted during a first encryption stage, using encryption engine ENCR1 502a and a first tweak based on e.g., a first key domain selector (KDS1) to generate a once encrypted unit of content/data C*. Next, once encrypted unit of content/data C* may be second encrypted during a second encryption stage, using encryption engine ENCR2 502b and a second tweak based on e.g., a first spatial selector to generate a twice encrypted unit of content/data C. The first spatial selector may be based on the physical address (Addr1) of the memory location within the memory where the twice encrypted content/data C would be stored.

At a later point in time, in response to a move operation to page a number of the twice encrypted units of content/data out of the memory to e.g., a hard disk, each of the twice encrypted units of content/data being paged out of the memory may be first decrypted during a first decryption stage, using decryption engine DECR2 504b (counterpart of ENCR2 502b) and the second tweak based on e.g., the spatial selector to generate the corresponding once encrypted unit of content/data C*. Thereafter, the once encrypted unit of content/data C* may be second pseudo decrypted in a second decryption stage, using decryption engine DECR1 504a (counterpart of ENCR1 502a) and a third tweak based on e.g., a second key domain selector (KDS2), to generate an obfuscated or disguised unit of content/data in plain text P*. The obfuscated/disguised units of content/data in plain text P* may then be stored on the page out device, e.g., a hard disk. In embodiments, the second and third tweaks used for each pair of the twice and once encrypted units of content/data may be different or the same.

At another later point in time, in response to a restore operation to restore the paged out units of content/data back into the memory, each unit of the disguised units of content/data in plaintext P* may be first encrypted during a first encryption stage, using encryption engine ENCR1 502a and the third tweak based on e.g., KDS2 to generate the corresponding once encrypted unit of content/data C*. Next, each of the once encrypted units of content/data C* may be second encrypted during a second encryption stage, using encryption engine ENCR2 502b and a fourth tweak based on e.g., a second spatial selector to generate a corresponding new twice encrypted unit of content/data $C^{}_{new}$. The second spatial selector may be based on the physical address (Addr2) of the new memory location within the memory where the new twice encrypted content/data $C^{}_{new}$ would be stored. Similarly, in embodiments, the third and fourth tweaks used for each pair of the disguised and once encrypted units of content/data may be different or the same.

At still a later point in time, in response to a read operation to read one of the new twice encrypted units of content/data $C^{}_{new}$ out of the memory, the twice encrypted unit of content/data $C^{}_{new}$ may be first decrypted during a first decryption stage, using decryption engine DECR2 504b (counterpart of ENCR2 502b) and the fourth tweak based on e.g., the second spatial selector (Addr2) to generate the corresponding once encrypted unit of content/data C*. Thereafter, the once encrypted unit of content/data C* may be second decrypted in a second decryption stage, using decryption engine DECR1 504a (counterpart of ENCR1 502a) and the first tweak based on e.g., KDS1, to generate the unit of content/data in plain text P.

Figure 6:
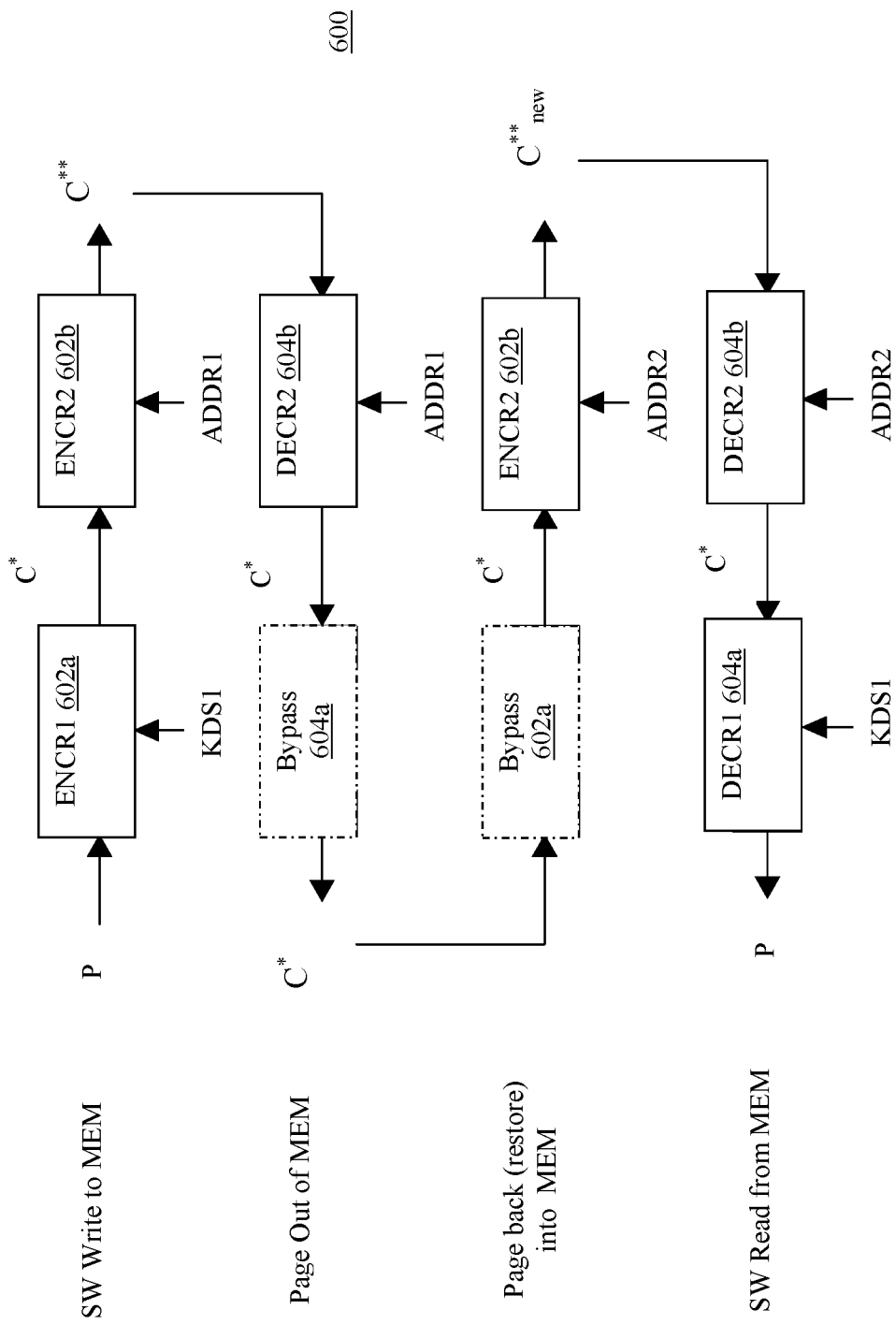
FIG. 6 illustrates another example process for paging out content from, and restoring paged-out content into memory, according to various embodiments

Referring now to FIG. 6, wherein another example process for paging out content from, and restoring paged-out content into memory, according to various embodiments, is shown. As shown, process 600 for providing multi-stage (split diffusion) memory security/protection, in response to memory page out and restore operations, may comprise operations performed at blocks 602a-602b, 604a, 606b, and 608a-608b. The operations may be respectively performed by e.g., encryption engines 306a-306b, and decryption engines 308a-308b.

As described earlier, in response to a write to memory operation, e.g., by application 114, OS 112, or FW/BIOS 113, content/data in plaintext P may be first encrypted during a first encryption stage, using encryption engine ENCR1 602a and a first tweak based on e.g., a first key domain selector (KDS1) to generate a once encrypted content/data C*. Next, once encrypted content/data C* may be second encrypted during a second encryption stage, using encryption engine ENCR2 602b and a second tweak based on e.g., a first spatial selector to generate a twice encrypted content/data C. The first spatial selector may be based on the physical address (Addr1) of the memory location within the memory where the twice encrypted content/data C would be stored.

At a later point in time, in response to a move operation to page a number of the twice encrypted units of content/data out of the memory to e.g., a hard disk, each of the twice encrypted units of content/data being paged out of the memory may be first decrypted during a first decryption stage, using decryption engine DECR2 604b (counterpart of ENCR2 602b) and the second tweak based on e.g., the spatial selector to generate the corresponding once encrypted unit of content/data C*. Thereafter, in response to a bypass signal, e.g., from processor 102, the main logic of memory controller 103 or based on the "color" of the selector, second decryption during the second decryption stage of the once encrypted content/data C* (e.g., using decryption engine DECR1 604a, counterpart of ENCR1 602a) may be bypassed. The once encrypted units of content/data C* may then be stored on the page out device, e.g., a hard disk. In embodiments, the second tweak used for each of the twice encrypted units of content/data may be different or the same.

At another later point in time, in response to a restore operation to restore the paged out units of content/data back into the memory, the first encryption during the first encryption stage of the once encrypted units of content/data C* (using e.g., encryption engine ENCR1 602a) may similarly be bypassed, e.g., in response to a bypass signal, e.g., from processor 102, the main logic of memory controller 103, or based on the "color" of the selector. Next, each of the once encrypted units of content/data C* may be second encrypted during a second encryption stage, using encryption engine ENCR2 602b and a third tweak based on e.g., a second spatial selector to generate a corresponding new twice encrypted unit of content/data $C^{}_{new}$. The second spatial selector may be based on the physical address (Addr2) of the new memory location within the memory where the new twice encrypted units of content/data $C^{}_{new}$ would be stored. In embodiments, the third tweak used for each of the once encrypted units of content/data may be different or the same.

At still a later point in time, in response to a read operation to read the new twice encrypted content/data $C^{}_{new}$ out of the memory, the twice encrypted content/data $C^{}_{new}$ out of the memory may be first decrypted during a first decryption stage, using decryption engine DECR2 604b (counterpart of ENCR2 602b) and the third tweak based on e.g., the second spatial selector (Addr2) to generate the once encrypted content/data C*. Thereafter, the once encrypted content/data C* may be second decrypted during a second decryption stage, using decryption engine DECR1 604*a* (counterpart of ENCR1 602*a*) and the first tweak based on e.g., KDS1, to generate the content/data in plain text P.

Referring back to FIG. 1, in embodiments, memory controller 103 may be configured to check fully decrypted data for corruption. In embodiments, to facilitate checking of a unit of fully decrypted data for corruption, memory controller 103 may be further configured to compute an integrity check value (ICV) for the unit of content/data. For example, when content/data are written into and read from memory 104 at a cache line granularity level, an ICV may be computed for each cache line of data, and stored in memory 104. At decryption, memory controller 103 may retrieve the stored ICV and determine whether the retrieved cache line of content/data has been potentially compromised, based at least in part on whether the ICV matches the retrieved cache line of content/data. In embodiments, memory controller 103 may also be configured to perform inline pattern checking, The additional ICV may be calculated and stored in memory only if the original plaintext data being written to memory does not pass the pattern check heuristic, e.g., because it was already random looking or encrypted or compressed etc. content/data. Thus, the additional reading of memory 104 to fetch and check an ICV stored in memory 104 may be avoided, when inline pattern check passes.

In embodiments, the plurality of selectors of different types $\{s_1, s_2, \ldots\}$ may include a key domain selector. For these embodiments, memory controller 103 may be configured to compute the integrity check value for a unit of data based only on bits of the unit of data and the encrypted unit of data that depend only on the key domain selector. In other embodiments, memory controller 103 may be configured to compute the integrity check value for the unit of content/data based only on bits of the encrypted unit of data.

In embodiments, the plurality of selectors of different types $\{s_1, s_2, \ldots\}$ may include a key domain selector; and to facilitate VM migration, the memory controller may be provided with a same secret key for generation of key domain selectors, as other apparatuses wherein virtual machines may be freely migrated among the apparatuses.

As will be appreciated by one skilled in the art, aspects the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
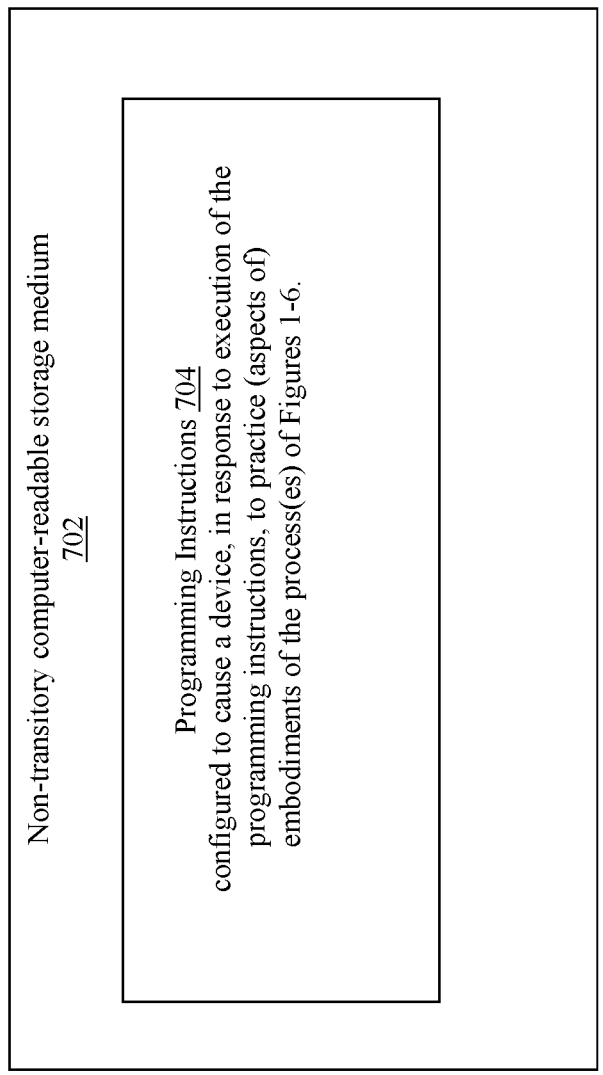
FIG. 7 illustrates a storage medium having instructions for practicing methods described with references to FIGS. 1-6, according to various embodiments.

FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a a computing device or a component thereof, e.g., memory controller 103, in response to execution of the programming instructions, to implement encryption engines 105 and decryption engines 107 to practice the multi-stage (split diffusion) memory integrity technology of the present disclosure. In alternate embodiments, programming instructions 604 may be disposed on multiple computer-readable non-transitory storage media 702 instead. In still other embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 1, for one embodiment, at least one of processors 102 may be packaged together with memory controller 103, including the multi-stage memory integrity technology, in one integrated circuit package. For one embodiment, at least one of processors 102 may be packaged together with memory controller 103, including the multi-stage memory integrity technology, to form a System in Package (SiP). For one embodiment, at least one of processors 102 may be packaged together with memory controller 103, including the multi-stage memory integrity technology, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for providing memory integrity, comprising: a plurality of stages that respectively includes a corresponding plurality of encryption engines to encrypt one or more units of data to be stored in a memory in response to a write or restore operation, prior to storing the one or more units of data into the memory; wherein to encrypt each of the one or more units of data, the encryption engines may successively encrypt each of the one or more units of data in a plurality of encryption stages using a plurality of tweaks based on a plurality of selectors of different types $\{s_1, s_2, \ldots\}$.

Example 2 may be example 1, wherein to encrypt each of the one or more units of data in a plurality of encryption stages in response to a write or restore operation, a first of the encryption engines may encrypt one of the one or more units of data in a first encryption stage using a first tweak based on a key domain selector to generate a corresponding once encrypted unit of data, and a second of the encryption engines may encrypt the once encrypted unit of data in a second encryption stage using a second tweak based on a spatial selector to generate a corresponding twice encrypted unit of data.

Example 3 may be example 2, wherein the spatial selector is associated with a physical address of a memory location of the memory, where the plural encrypted unit of data may be stored.

Example 4 may be example 2, wherein the first and second encryption engines respectively may comprise first and second block ciphers.

Example 5 may be example 4, wherein the first or the second block ciphers may comprise Advanced Encryption Standard (AES), Xor-encrypt-xor (XEX)-based tweaked-codebook mode with cipher text stealing (XTS) block ciphers.

Example 6 may be example 4, wherein the first block ciphers may comprise Advanced Encryption Standard (AES) electronic codebook (ECB) block ciphers.

Example 7 may be example 1, wherein the plurality of stages further may comprise: one or more decryption engines in one or more of the plurality of stages to partially decrypt, fully decrypt or pseudo decrypt one or more of the plural encrypted units of data, in response to a read, move or copy operation; wherein the one or more decryption engines may partially decrypt, fully decrypt or pseudo decrypt the one or more of the plural encrypted units of data in one or more decryption stages using one or more tweaks based at least on a subset of one or more of the plurality of selectors of different types $\{s_1, s_2, \ldots\}$.

Example 8 may be example 7, wherein the one or more decryption engines may fully decrypt one of the one or more plural encrypted units of data, in response to a read operation performed by a processor coupled with the memory; wherein to fully decrypt the one of the one or more plural encrypted units of data in one or more decryption stages, a first of the one or more decryption engines may decrypt the one plural encrypted unit of data in a first decryption stage using a first tweak based on a spatial selector to generate a partially decrypted unit of data, and a second of the one or more decryption engines may decrypt the partially decrypted unit of data in a second decryption stage using a second tweak based on a key domain selector to generate the unit of data in plaintext.

Example 9 may be example 7, wherein the memory is viewed as organized into pages, with each page having a plurality of the plural encrypted units of data, and wherein the one or more decryption engines may partially decrypt the plurality of the plural encrypted units of data, in response to a move operation to page a memory page where the plurality of plural encrypted units of data are stored, out of the memory; wherein to partially decrypt each of the plurality of the plural encrypted units data in one or more decryption stages, one of the one or more decryption engines may decrypt each of the plurality of the plural encrypted units data in a decryption stage using a tweak based on a spatial selector to generate a corresponding partially decrypted unit of data; wherein the tweaks used to generate the different corresponding partially decrypted units of data are different.

Example 10 may be example 9, wherein the one or more decryption engines may cease further decryption after generation of the partially decrypted data in response to receipt of a bypass command to bypass additional decryption.

Example 11 may be example 7, wherein the one or more decryption engines may partially decrypt or pseudo decrypt a plurality of the plural encrypted data, in response to a move operation to migrate a virtual machine from the apparatus or a computing device having the apparatus, where the plurality of the plural encrypted data is associated with the virtual machine.

Example 12 may be example 7, wherein the one or more decryption engines may partially decrypt or pseudo decrypt one or more of the plural encrypted units of data, in response to a read operation associated with a direct memory access (DMA) of the one or more plural encrypted units of data by a device with DMA of the memory, to create a copy of the one or more plural encrypted units of data on the device.

Example 13 may be example 7, wherein to encrypt the one or more units of data in a plurality of encryption stages in response to a write operation, a first of the encryption engines may encrypt one of the one or more units of data in a first encryption stage using a first tweak based on a first key domain selector to generate a once encrypted unit of data, and a second of the encryption engines may encrypt the once encrypted units of data in a second encryption stage using a second tweak based on a spatial selector to generate a twice encrypted unit of data; wherein the memory is viewed as organized into pages, with each page having a plurality of the plural encrypted units of data, and the one or more decryption engines may pseudo decrypt a plurality of the plural encrypted units data when moving a plurality of the twice encrypted units of data from the memory in response to a paging event paging a memory page where the plurality of the plural encrypted data are stored, out of the memory; and wherein to pseudo decrypt the plurality of twice encrypted units of data in the plurality of decryption stages, a first of the plurality of decryption engines may decrypt each of the plurality of twice encrypted units of data in a first decryption stage using the second tweak based on the spatial selector to generate a corresponding partially decrypted unit of data, and a second of the plurality of decryption engines may pseudo decrypt the corresponding partially decrypted unit data in a second decryption stage using a third tweak based on a second key domain selector to generate a corresponding pseudo decrypted unit of data; wherein the first and second tweaks used for each pair of the plurality of the twice encrypted and partially decrypted units of data are different.

Example 14 may be example 13, wherein the spatial selector is a first spatial selector; wherein to encrypt the plurality units of data to be stored in a memory in response to a restore operation may encrypt the plurality of pseudo decrypted units data in a plurality of encryption stages in response to a restore operation, restoring the paged out memory page having the plurality of pseudo decrypted units data into the memory; and wherein to encrypt the plurality of pseudo decrypted data in a plurality of encryption stages, the first of the encryption engines may encrypt each of the plurality of pseudo decrypted units of data in the first encryption stage using the third tweak based on the second key domain selector to generate the corresponding once encrypted unit of data, and the second of the encryption engines may encrypt the corresponding once encrypted unit of data in the second encryption stage using a fourth tweak based on a second spatial selector to generate a corresponding new twice encrypted unit data; wherein the third and fourth tweaks used for each pair of the plurality of the pseudo decrypted and once encrypted units of data are different.

Example 15 may be any one of examples 1-14, wherein the apparatus may be hosted in a memory controller.

Example 16 may be any one of examples 1-14, wherein a last of the plurality of stages may be disposed in a memory controller, and one or more of the plurality of stages precede the last stage may be disposed outside the memory controller.

Example 17 may be example 16, wherein one of the one or more of the plurality of stages precedes the last stage may be disposed in a cache or a processor coupled with the memory controller.

Example 18 may be an apparatus for providing memory integrity, comprising: a plurality of stages having one or more decryption engines disposed in one or more of the plurality of stages to partially decrypt, fully decrypt or pseudo decrypt one or more plural encrypted units of data encrypted using a plurality of tweaks based on a plurality of selectors of different types $\{s_1, s_2, \ldots\}$, in response to a read, move or copy operation; wherein the one or more decryption engines may partially decrypt, fully decrypt or pseudo decrypt each of the plural encrypted units of data in one or more decryption stages using one or more tweaks based at least on a subset of one or more of the plurality of selectors of different types $\{s_1, s_2, \ldots\}$.

Example 19 may be example 18, wherein the one or more decryption engines may fully decrypt one of the one or more plural encrypted units of data, in response to a read operation performed by a processor coupled with the memory; wherein to fully decrypt the one plural encrypted unit of data in one or more decryption stages, a first of the one or more decryption engines may decrypt the one plural encrypted unit of data in a first decryption stage using a first tweak based on a spatial selector to generate a corresponding partially decrypted unit of data, and a second of the one or more decryption engines may decrypt the corresponding partially decrypted unit of data in a second decryption stage using a second tweak based on a key domain selector to generate the unit data in plaintext.

Example 20 may be example 18, wherein the memory is viewed as organized into pages, with each page having a plurality of the plural encrypted units of data, and wherein the one or more decryption engines may partially decrypt a plurality of the plural encrypted units of data, in response to a move operation to page a memory page where the plurality of the plural encrypted units of data are stored, out of the memory; wherein to partially decrypt each of the plurality of the plural encrypted units of data in one or more decryption stages, one of the one or more decryption engines may decrypt each of the plurality of the plural encrypted units of data in a decryption stage using a tweak based on a spatial selector to generate a partially decrypted data, wherein the tweaks used for the plural encrypted units of data are different.

Example 21 may be example 20, wherein the one or more decryption engines may cease further decryption after generation of the partially decrypted data in response to receipt of a bypass command to bypass additional decryption.

Example 22 may be example 18, wherein the one or more decryption engines may partially decrypt or pseudo decrypt a plurality of the plural encrypted units of data, in response to a move operation to migrate a virtual machine from the apparatus or a computing device having the apparatus, where the plural encrypted data is associated with the virtual machine.

Example 23 may be example 18, wherein the one or more decryption engines may partially decrypt or pseudo decrypt a plurality of the plural encrypted units of data, in response to a read operation associated with a direct memory access (DMA) of the plurality of the plural encrypted units of data by a device with DMA of the memory, to create a copy the plurality of plural encrypted units of data on the device.

Example 24 may be example 18, wherein the one or more plural encrypted units of data are encrypted in a plurality of encryption stages, wherein a first of the encryption engines may encrypt each of the one or more units data in a first encryption stage using a first tweak based on a first key domain selector to generate a corresponding once encrypted unit of data, and a second of the encryption engines may encrypt the corresponding once encrypted unit of data in a second encryption stage using a second tweak based on a spatial selector to generate a corresponding twice encrypted unit of data; wherein the memory is viewed as organized into a plurality of pages, with each page having a plurality of the plural encrypted data, and the one or more decryption engines may pseudo decrypt a plurality of the plural encrypted units of data when moving the plurality of the plural encrypted units of data from the memory in response to a paging event paging a memory page where the plurality of plural encrypted units of data are stored, out of the memory; and wherein to pseudo decrypt the plurality of the plural encrypted units of data in the plurality of decryption stages, a first of the plurality of decryption engines may decrypt each of the plurality of plural encrypted units of data in a first decryption stage using the second tweak based on the spatial selector to generate a corresponding partially decrypted unit of data, and a second of the plurality of decryption engines may pseudo decrypt the corresponding partially decrypted unit of data in a second decryption stage using a third tweak based on a second spatial selector to generate a pseudo decrypted unit of data; wherein the second and third tweaks used for each pair of the plurality encrypted and partially decrypted units of data are different.

Example 25 may be any one of examples 18-24, wherein the apparatus may be hosted in a memory controller.

Example 26 may be any one of examples 18-24, wherein a last of the plurality of stages may be disposed in a memory controller, and one or more of the plurality of stages precede the last stage may be disposed outside the memory controller.

Example 27 may be example 26, wherein one of the one or more of the plurality of stages precede the last stage may be disposed in a cache or a processor coupled with the memory controller.

Example 28 may be an apparatus for computing, comprising volatile memory; a processor having one or more cores, and one or more levels of cache; a memory controller coupled with the volatile memory and the processor to control the volatile memory; and a multi-stage memory integrity arrangement that includes a plurality of stages having: a plurality of encryption engines correspondingly disposed at the plurality of stages to encrypt one or more cache lines of data to be stored in a memory in response to a write or restore operation, prior to storing the one or more cache lines of data into the memory; wherein to encrypt one of the one or more cache line of data, the encryption engines may successively encrypt the one cache line of data in a plurality of encryption stages using a plurality of tweaks based on a plurality of selectors of different types $\{s_1, s_2, \ldots\}$; and one or more decryption engines correspondingly disposed at one or more of the plurality of stages to partially decrypt, fully decrypt or pseudo decrypt one or more of the plural encrypted cache lines of data, in response to a read, move or copy operation; wherein the one or more decryption engines may partially decrypt, fully decrypt or pseudo decrypt each of the one or more plural encrypted cache line of data in one or more decryption stages using one or more tweaks based at least on a subset of one or more of the plurality of selectors of different types $\{s_1, s_2, \ldots\}$.

Example 29 may be example 28, wherein the memory controller may further check a fully decrypted cache line of data for corruption.

Example 30 may be example 29, wherein to facilitate checking of a fully decrypted cache line of data for corruption, the memory controller may further compute an integrity check value for the cache line of data.

Example 31 may be example 30, wherein the plurality of selectors of different types $\{s_1, s_2, \ldots\}$ may include a key domain selector; and wherein the memory controller may compute the integrity check value for the cache line of data based only on bits of the data and the encrypted cache line of data that depend only on the key domain selector.

Example 32 may be example 30, wherein the memory controller may compute the integrity check value for the cache line of data based only on bits of the encrypted cache line of data.

Example 33 may be example 28, wherein the plurality of selectors of different types $\{s_1, s_2, \ldots\}$ may include a key domain selector; and wherein the memory controller is provide with a same secret key for generation of key domain selectors, as another apparatus wherein virtual machines may be freely migrated between the two apparatuses.

Example 34 may be example 28-33, wherein the multi-stage memory integrity arrangement may be disposed in the memory controller.

Example 35 may be example 28-33, wherein a last of the plurality of stages may be disposed in the memory controller, and one or more of the plurality of stages precede the last stage may be disposed outside the memory controller.

Example 36 may be example 35, wherein one of the one or more of the plurality of stages precede the last stage may be disposed in the processor.

Example 37 may be a method for providing memory integrity, comprising: encrypting, by a computing device, one or more cache line of data to be stored in a memory in response to a write or restore operation, prior to storing the one or more cache line of data into the memory; wherein encrypting the cache line of data may comprise successively encrypting the cache line of data in a plurality of encryption stages using a plurality of tweaks based on a plurality of selectors of different types $\{s_1, s_2, \ldots\}$; and wherein the plurality of selectors of different types include a key domain selector and a spatial selector.

Example 38 may be example 37 further comprising: partially decrypting, fully decrypting or pseudo decrypting, by the computing device, one of more of the plural encrypted cache lines of data, in response to a read, move or copy operation; wherein partially decrypting, fully decrypting or pseudo decrypting may comprise partially decrypting, fully decrypting or pseudo decrypting the plural encrypted cache lines of data in one or more decryption stages using one or more tweaks based at least on a subset of one or more of the plurality of selectors of different types $\{s_1, s_2, \ldots\}$.

Example 39 may be one or more computer-readable media comprising instructions that cause a memory controller, in response to execution of the instructions by the memory controller, to operate: a plurality of encryption engines to encrypt one or more cache lines of data to be stored in a memory in response to a write or restore operation, prior to storing the one or more cache lines of data into the memory; wherein to encrypt the one or more cache lines of data, the encryption engines may successively encrypt the one or more cache line of data in a plurality of encryption stages using a plurality of tweaks based on a plurality of selectors of different types $\{s_1, s_2, \ldots\}$; or one or more decryption engines to partially decrypt, fully decrypt or pseudo decrypt the one or more plural encrypted cache lines of data, in response to a read, move or copy operation; wherein the one or more decryption engines may partially decrypt, fully decrypt or pseudo decrypt the one or more plural encrypted cache lines of data in one or more decryption stages using one or more tweaks based at least on a subset of one or more of the plurality of selectors of different types $\{s_1, s_2, \ldots\}$; wherein the memory controller may be further caused to check a fully decrypted cache line of data for corruption.

Example 40 may be example 39, wherein to facilitate checking of a fully decrypted cache line of data for corruption, the memory controller may be further caused to compute an integrity check value for the cache line of data.

Example 41 may be example 40, wherein the plurality of selectors of different types $\{s_1, s_2, \ldots\}$ may include a key domain selector; and wherein the memory controller may be further caused to compute the integrity check value for the cache line of data based only on bits of the data and the encrypted cache line of data that depend only on the key domain selector.

Example 42 may be example 40, wherein the memory controller may be further caused to compute the integrity check value for the cache line of data based only on bits of the encrypted data.

Example 43 may be an apparatus for providing memory integrity, comprising: means for encrypting one or more units of data to be stored in a memory in response to a write or restore operation, prior to storing the one or more units of data into the memory; including means for successively encrypting the one or more units of data in a plurality of encryption stages using a plurality of tweaks based on a plurality of selectors of different types $\{s_1, s_2, \ldots\}$, including a key domain selector; and means for computing one or more integrity check values for the one or more units of data based only on bits of the units of data and the encrypted data that depend only on the key domain selector.

Example 44 may be example 43, further comprising means for partially decrypting, fully decrypting or pseudo decrypting one or more of the plural encrypted units of data, in response to a read, move or copy operation, including means for partially decrypting, fully decrypting or pseudo decrypting one or more of the plural encrypted data in one or more decryption stages using one or more tweaks based at least on a subset of one or more of the plurality of selectors of different types $\{s_1, s_2, \ldots\}$.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for providing memory integrity, comprising:
   a plurality of stages that respectively includes a corresponding plurality of encryption engines to encrypt one or more units of data to be stored in a memory in response to a write or restore operation, prior to storing the one or more units of data into the memory; wherein to encrypt each of the one or more units of data, the encryption engines are to successively encrypt each of the one or more units of data in a plurality of encryption stages using a plurality of tweaks based on a plurality of selectors of different types $\{s_1, s_2, \ldots\}$;
   wherein to encrypt each of the one or more units of data in a plurality of encryption stages in response to a write or restore operation, a first of the encryption engines is to encrypt one of the one or more units of data in a first encryption stage using a first tweak based on a key domain selector to generate a corresponding once encrypted unit of data, and a second of the encryption engines is to encrypt the once encrypted unit of data in a second encryption stage using a second tweak based on a spatial selector to generate a corresponding twice encrypted unit of data.

2. The apparatus of claim 1, wherein the spatial selector is associated with a physical address of a memory location of the memory, where the plural encrypted unit of data is to be stored.

3. The apparatus of claim 1, wherein the first and second encryption engines respectively comprise first and second block ciphers.

4. The apparatus of claim 3, wherein the first or the second block ciphers comprise Advanced Encryption Standard (AES), Xor-encrypt-xor (XEX)-based tweaked-codebook mode with cipher text stealing (XTS) block ciphers.

5. The apparatus of claim 3, wherein the first block ciphers comprise Advanced Encryption Standard (AES) electronic codebook (ECB) block ciphers.

6. The apparatus of claim 1, wherein the plurality of stages further comprise:
one or more decryption engines in one or more of the plurality of stages to partially decrypt, fully decrypt or pseudo decrypt one or more of the plural encrypted units of data, in response to a read, move or copy operation; wherein the one or more decryption engines are to partially decrypt, fully decrypt or pseudo decrypt the one or more of the plural encrypted units of data in one or more decryption stages using one or more tweaks based at least on a subset of one or more of the plurality of selectors of different types $\{s_1, s_2, \ldots\}$.

7. The apparatus of claim 6, wherein the one or more decryption engines are to fully decrypt one of the one or more plural encrypted units of data, in response to a read operation performed by a processor coupled with the memory; wherein to fully decrypt the one of the one or more plural encrypted units of data in one or more decryption stages, a first of the one or more decryption engines is to decrypt the one plural encrypted unit of data in a first decryption stage using a first tweak based on a spatial selector to generate a partially decrypted unit of data, and a second of the one or more decryption engines is to decrypt the partially decrypted unit of data in a second decryption stage using a second tweak based on a key domain selector to generate the unit of data in plaintext.

8. The apparatus of claim 6, wherein the memory is viewed as organized into pages, with each page having a plurality of the plural encrypted units of data, and wherein the one or more decryption engines are to partially decrypt the plurality of the plural encrypted units of data, in response to a move operation to page a memory page where the plurality of plural encrypted units of data are stored, out of the memory; wherein to partially decrypt each of the plurality of the plural encrypted units data in one or more decryption stages, one of the one or more decryption engines is to decrypt each of the plurality of the plural encrypted units data in a decryption stage using a tweak based on a spatial selector to generate a corresponding partially decrypted unit of data; wherein the tweaks used to generate the different corresponding partially decrypted units of data are different.

9. The apparatus of claim 8, wherein the one or more decryption engines are to cease further decryption after generation of the partially decrypted data in response to receipt of a bypass command to bypass additional decryption.

10. The apparatus of claim 6, wherein the one or more decryption engines are to partially decrypt or pseudo decrypt a plurality of the plural encrypted data, in response to a move operation to migrate a virtual machine from the apparatus or a computing device having the apparatus, where the plurality of the plural encrypted data is associated with the virtual machine.

11. The apparatus of claim 6, wherein the one or more decryption engines are to partially decrypt or pseudo decrypt one or more of the plural encrypted units of data, in response to a read operation associated with a direct memory access (DMA) of the one or more plural encrypted units of data by a device with DMA of the memory, to create a copy of the one or more plural encrypted units of data on the device.

12. The apparatus of claim 6, wherein to encrypt the one or more units of data in a plurality of encryption stages in response to a write operation, a first of the encryption engines is to encrypt one of the one or more units of data in a first encryption stage using a first tweak based on a first key domain selector to generate a once encrypted unit of data, and a second of the encryption engines is to encrypt the once encrypted units of data in a second encryption stage using a second tweak based on a spatial selector to generate a twice encrypted unit of data;
wherein the memory is viewed as organized into pages, with each page having a plurality of the plural encrypted units of data, and the one or more decryption engines are to pseudo decrypt a plurality of the plural encrypted units data when moving a plurality of the twice encrypted units of data from the memory in response to a paging event paging a memory page where the plurality of the plural encrypted data are stored, out of the memory; and
wherein to pseudo decrypt the plurality of twice encrypted units of data in the plurality of decryption stages, a first of the plurality of decryption engines is to decrypt each of the plurality of twice encrypted units of data in a first decryption stage using the second tweak based on the spatial selector to generate a corresponding partially decrypted unit of data, and a second of the plurality of decryption engines is to pseudo decrypt the corresponding partially decrypted unit data in a second decryption stage using a third tweak based on a second key domain selector to generate a corresponding pseudo decrypted unit of data; wherein the first and second tweaks used for each pair of the plurality of the twice encrypted and partially decrypted units of data are different.

13. The apparatus of claim 12, wherein the spatial selector is a first spatial selector; wherein to encrypt the plurality units of data to be stored in a memory in response to a restore operation is to encrypt the plurality of pseudo decrypted units data in a plurality of encryption stages in response to a restore operation, restoring the paged out memory page having the plurality of pseudo decrypted units data into the memory; and wherein to encrypt the plurality of pseudo decrypted data in a plurality of encryption stages, the first of the encryption engines is to encrypt each of the plurality of pseudo decrypted units of data in the first encryption stage using the third tweak based on the second key domain selector to generate the corresponding once encrypted unit of data, and the second of the encryption engines is to encrypt the corresponding once encrypted unit of data in the second encryption stage using a fourth tweak based on a second spatial selector to generate a corresponding new twice encrypted unit data; wherein the third and fourth tweaks used for each pair of the plurality of the pseudo decrypted and once encrypted units of data are different.

14. The apparatus of claim 1, wherein the apparatus is hosted in a memory controller.

15. The apparatus of claim 1, wherein a last of the plurality of stages is disposed in a memory controller, and one or more of the plurality of stages precede the last stage are disposed outside the memory controller.

16. The apparatus of claim 15, wherein one of the one or more of the plurality of stages that precedes the last stage is disposed in a cache or a processor coupled with the memory controller.

17. An apparatus for computing, comprising
volatile memory;
a processor having one or more cores, and one or more levels of cache;
a memory controller coupled with the volatile memory and the processor to control the volatile memory; and a multi-stage memory integrity arrangement that includes a plurality of stages having:
a plurality of encryption engines correspondingly disposed at the plurality of stages to encrypt one or more cache lines of data to be stored in a memory in response to a write or restore operation, prior to storing the one or more cache lines of data into the memory; wherein to encrypt one of the one or more cache lines of data, the encryption engines are to successively encrypt the one cache line of data in a plurality of encryption stages using a plurality of tweaks based on a plurality of selectors of different types $\{s_1, s_2, \ldots\}$; and
one or more decryption engines correspondingly disposed at one or more of the plurality of stages to partially decrypt, fully decrypt or pseudo decrypt one or more of the plural encrypted cache lines of data, in response to a read, move or copy operation; wherein the one or more decryption engines are to partially decrypt, fully decrypt or pseudo decrypt each of the one or more plural encrypted cache line of data in one or more decryption stages using one or more tweaks based at least on a subset of one or more of the plurality of selectors of different types $\{s_1, s_2, \ldots\}$;
wherein the plurality of selectors of different types include a key domain selector and a spatial selector.

18. The apparatus of claim 17, wherein the memory controller is to further check a fully decrypted cache line of data for corruption.

19. The apparatus of claim 18, wherein to facilitate checking of a fully decrypted cache line of data for corruption, the memory controller is to further compute an integrity check value for the cache line of data.

20. The apparatus of claim 19, wherein the plurality of selectors of different types $\{s_1, s_2, \ldots\}$ include a key domain selector; and wherein the memory controller is to compute the integrity check value for the cache line of data based only on bits of the data and the encrypted cache line of data that depend only on the key domain selector.

21. The apparatus of claim 19, wherein the memory controller is to compute the integrity check value for the cache line of data based only on bits of the encrypted cache line of data.

22. The apparatus of claim 17, wherein the plurality of selectors of different types $\{s_1, s_2, \ldots\}$ include a key domain selector; and wherein the memory controller is provide with a same secret key for generation of key domain selectors, as another apparatus wherein virtual machines are freely migrated between the two apparatuses.

23. A method for providing memory integrity, comprising:
encrypting, by a computing device, one or more cache lines of data to be stored in a memory in response to a write or restore operation, prior to storing the one or more cache lines of data into the memory;
wherein encrypting the cache line of data comprises successively encrypting the cache line of data in a plurality of encryption stages using a plurality of tweaks based on a plurality of selectors of different types $\{s_1, s_2, \ldots\}$;
wherein the plurality of selectors of different types include a key domain selector and a spatial selector; and
wherein successively encrypting the cache line of data in a plurality of encryption stages comprises first encrypting the cache line of data in a first encryption stage using a first tweak based on the key domain selector to generate a corresponding once encrypted cache line of data, and second encrypting the once encrypted cache line of data in a second encryption stage using a second tweak based on the spatial selector to generate a corresponding twice encrypted unit of data.

24. The method of claim 23, further comprising:
partially decrypting, fully decrypting or pseudo decrypting, by the computing device, one of more of the plural encrypted cache lines of data, in response to a read, move or copy operation;
wherein partially decrypting, fully decrypting or pseudo decrypting comprises partially decrypting, fully decrypting or pseudo decrypting the plural encrypted cache lines of data in one or more decryption stages using one or more tweaks based at least on a subset of one or more of the plurality of selectors of different types $\{s_1, s_2, \ldots\}$.

* * * * *